United States Patent
Lee et al.

(10) Patent No.: US 8,767,723 B2
(45) Date of Patent: Jul. 1, 2014

(54) METHOD AND APPARATUS OF TRANSMITTING AND RECEIVING SYSTEM INFORMATION IN A WIRELESS COMMUNICATION SYSTEM

(75) Inventors: Young Dae Lee, Anyang-si (KR); Sung Hoon Jung, Anyang-si (KR); Seung June Yi, Anyang-si (KR); Sung Duck Chun, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 33 days.

(21) Appl. No.: 13/518,999

(22) PCT Filed: Feb. 8, 2011

(86) PCT No.: PCT/KR2011/000812
§ 371 (c)(1),
(2), (4) Date: Jun. 25, 2012

(87) PCT Pub. No.: WO2011/099744
PCT Pub. Date: Aug. 18, 2011

(65) Prior Publication Data
US 2012/0287836 A1 Nov. 15, 2012

Related U.S. Application Data

(60) Provisional application No. 61/302,927, filed on Feb. 9, 2010.

(30) Foreign Application Priority Data

Jan. 11, 2011 (KR) .......................... 10-2011-002582

(51) Int. Cl.
*H04J 3/24* (2006.01)

(52) U.S. Cl.
USPC ............ 370/373; 370/426; 370/496; 370/913

(58) Field of Classification Search
USPC .......................................... 370/373, 426, 496
See application file for complete search history.

(56) References Cited

U.S. PATENT DOCUMENTS

| | | | |
|---|---|---|---|
| 6,628,946 B1 * | 9/2003 | Wiberg et al. | 455/434 |
| 8,180,356 B2 * | 5/2012 | Hu | 455/450 |
| 8,509,795 B2 * | 8/2013 | Wu | 455/452.1 |
| 8,537,724 B2 * | 9/2013 | Love et al. | 370/280 |
| 8,538,444 B2 * | 9/2013 | Lee et al. | 455/450 |
| 8,548,507 B2 * | 10/2013 | Ko et al. | 455/422.1 |
| 2004/0148352 A1 * | 7/2004 | Menon et al. | 709/205 |
| 2006/0251019 A1 * | 11/2006 | Dalsgaard et al. | 370/331 |

(Continued)

FOREIGN PATENT DOCUMENTS

WO 2009-038367 A1 3/2009

*Primary Examiner* — Ricky Ngo
*Assistant Examiner* — Dewanda Samuel
(74) *Attorney, Agent, or Firm* — Morgan, Lewis & Bockius LLP

(57) ABSTRACT

A method and apparatus for transmitting and receiving system information in a wireless communication system are disclosed. A method for receiving system information of a wireless device wirelessly communicating with a base station (BS) and a terminal in a wireless communication system includes receiving system information change information from the base station (BS) through a dedicated time unit used for communication between the base station (BS) and the wireless device, and receiving system information from the base station (BS) through a different time unit from the dedicated time unit.

8 Claims, 4 Drawing Sheets

(56) References Cited

U.S. PATENT DOCUMENTS

| | | | |
|---|---|---|---|
| 2008/0318566 A1* | 12/2008 | Chun et al. | 455/422.1 |
| 2009/0319903 A1 | 12/2009 | Alanara | |
| 2010/0080139 A1* | 4/2010 | Palanki et al. | 370/252 |
| 2011/0081898 A1* | 4/2011 | Park | 455/418 |

* cited by examiner

METHOD AND APPARATUS OF TRANSMITTING AND RECEIVING SYSTEM INFORMATION IN A WIRELESS COMMUNICATION SYSTEM

This is a U.S. National Phase Entry of PCT Application No. PCT/KR2011/000812, filed Feb. 8, 2011, and claims the benefit of Korean Patent Application No. 10-2011-0002582 filed Jan. 11, 2011 and claims the benefit of U.S. Provisional Application No. 61/302,927 filed Feb. 9, 2010.

TECHNICAL FIELD

The present invention relates to a wireless communication system, and more particularly to a method and apparatus for transmitting and receiving system information in a wireless communication system.

BACKGROUND ART

An Evolved Universal Terrestrial Radio Access Network (E-UTRAN) system will hereinafter be described with reference to FIG. 1.

FIG. 1 is a conceptual diagram illustrating an E-UTRAN structure. The E-UTRAN has evolved from a legacy UTRAN, and basic standardization thereof is now being conducted by the 3rd Generation Partnership Project (3GPP). The E-UMTS system may also be called a Long Term Evolution (LTE) system.

The E-UTRAN includes one or more "eNode B(s)" or "eNB(s)". The eNBs are connected through an X2 interface. Each eNB is connected to a User Equipment (UE) through a radio interface and is connected to an Evolved Packet Core (EPC) through an S1 interface.

The EPC may include a Mobility Management Entity (MME), a Serving-Gateway (S-GW), and a Packet Data Network-Gateway (PDN-GW). The MME may include UE access information or UE capability information, and this information is generally adapted to manage UE mobility. The S-GW is a gateway in which the E-UTRAN is located at an end point, and the PDN-GW is a gateway in which a Packet Data Network (PDN) is located at an end point.

Radio interface protocol layers between the UE and the network are classified into a first layer (L1), a second layer (L2), and a third layer (L3) on the basis of three lower layers of an Open System Interconnection (OSI) reference model well known in the field of communication systems. The first layer (L1) provides an information transfer service using a physical channel. A radio resource control (RRC) layer located at the third layer (L3) controls radio resources between the UE and the network. For this operation, the RRC layer exchanges RRC messages between the UE and the network.

FIG. 2 illustrates a control plane of a radio interface protocol between a User Equipment (UE) and a UMTS Terrestrial Radio Access Network (UTRAN) according to the 3GPP wireless access network standard. FIG. 3 illustrates a user plane (U-Plane) of a radio interface protocol between a User Equipment (UE) and an E-UTRAN according to the 3GPP wireless access network standard.

A radio interface protocol includes a physical layer, a data link layer, and a network layer horizontally. Vertically, the radio interface protocol includes a user plane for transmitting data information and a control plane for transmitting a control signal (i.e., a signaling message). The protocol layers shown in FIG. 2 may be classified into a first layer (L1), a second layer (L2), and a third layer (L3) on the basis of the three lower layers of an Open System Interconnection (OSI) reference model well known in the field of communication systems. The UE and the E-UTRAN include a pair of such radio protocol layers, and are used to transmit data via an air interface.

A physical layer serving as the first layer (L1) transmits an information transfer service to an upper layer over a physical channel. The physical layer is connected to a Medium Access Control (MAC) layer serving as an upper layer over a transport channel. Data is transferred from the MAC layer to the physical layer or the transport channel, or is also transferred from the physical layer to the MAC layer. In addition, data is transferred between different physical layers over the physical channel. In other words, data is transferred from a transmitting physical layer to a receiving physical layer over the physical channel. The above-mentioned physical channel is modulated according to an orthogonal frequency division multiplexing (OFDM) scheme, so that the physical channel uses time and frequency information as radio resources.

The MAC layer of the second layer (L2) transmits services to a Radio Link Control (RLC) layer serving as an upper layer over a logical channel. The RLC layer of the second layer (L2) supports reliable data transmission.

The RLC layer function may be implemented as a functional block contained in the MAC layer. In this case, the RLC layer may not be present. A Packet Data Convergence Protocol (PDCP) layer of the second layer (L2) performs a header compression function to reduce the size of an IP packet header having relatively large and unnecessary control information in order to efficiently transmit IP packets such as IPv4 or IPv6 packets in a radio interval with a narrow bandwidth.

The radio resource control (RRC) layer located at the lowest of the third layer (L3) is defined on a control plane only. In association with configuration, re-configuration, and release of radio bearers (RBs), the RRC layer controls the logical channel, the transport channel, and the physical channels. In this case, the above radio bearer (RB) is provided from the second layer (L2) to perform data communication between the UE and the UTRAN. If an RRC connection is located between the RRC layer of the UE and the RRC layer of the radio network, the UE stays in an RRC connected (RRC_CONNECTED) state. Otherwise, the UE stays in an RRC idle (RRC_IDEL) state.

There are a plurality of downlink transport channels for transmitting data from the network to the UE, for example, a broadcast channel (BCH) for transmitting system information, a paging channel (PCH) for transmitting paging messages, and a downlink shared channel (DL-SCH) for transmitting user traffic or control messages. Traffic or control messages of a downlink multicast or a broadcast service (Multimedia Broadcast/Multicast Service: MBMS) may be transmitted over a downlink multicast channel (MCH). In the meantime, there are a plurality of uplink transport channels for transmitting data from the UE to the network, for example, a random access channel (RACH) for transmitting initial control messages, and an uplink shared channel for transmitting user traffic or control messages.

A plurality of logical channels are located above the transport channel, and are mapped to the transport channel. For example, the logical channels may be a broadcast channel (BCCH), a paging control channel (PCCH), a common control channel (CCCH), a multicast control channel (MCCH), and a multicast traffic channel (MTCH).

A physical channel includes a plurality of subframes on the time axis and a plurality of subcarriers on the frequency axis. Here, one subframe includes a plurality of symbols on the time axis. One subframe includes a plurality of resource blocks and one resource block includes a plurality of symbols and a plurality of subcarriers. Each subframe can use specific subcarriers of a specific symbol (e.g., a first symbol) of the subframe for a Physical Downlink Control Channel (PD-CCH) (i.e., an L1/L2 control channel). Each subframe has 0.5 ms. A Transmission Time Interval (TTI), which is a time unit during which data is transmitted, is 1 ms.

A detailed description will hereinafter be given of the RRC state and the RRC connection method, a UE's RRC state and its RRC connection method. The RRC state indicates whether a UE's RRC layer is logically connected to an E-UTRAN's RRC layer. If it is determined that the UE's RRC layer is logically connected to the E-UTRAN's RRC layer, this state is called an RRC connected (RRC_CONNECTED) state. If the UE's RRC layer is not logically connected to the E-UTRAN's RRC layer, this state is called an RRC idle (RRC_IDLE) state. A UE in the RRC connected (RRC_CONNECTED) state has an RRC connection, such that the E-UTRAN can recognize the presence of the corresponding UE in units of a cell. As a result, the UE can be effectively controlled. Otherwise, a UE in an RRC idle (RRC_IDLE) state cannot be recognized by the E-UTRAN, but is controlled by a core network (CN) in units of a tracking area larger than the cell. In other words, only the presence or absence of the above RRC-connected UE is recognized in units of a large region. If the RRC-connected UE desires to receive a general mobile communication service such as a voice or data service, the UE must enter the RRC connection state. Associated detailed description will hereinafter be described in detail.

If a user initially powers on his or her UE, the UE searches for an appropriate cell, and remains in an RRC_IDLE state in the searched cell. The UE in the RRC_IDLE state establishes an RRC connection in association with the E-UTRAN's RRC layer through an RRC connection procedure when it needs to establish the RRC connection, such that it is shifted to the RRC_CONNECTED state. The UE under the RRC_IDLE state must establish the RRC connection for a variety of reasons. For example, if uplink data transmission is needed when placing a call, or if a paging message is received from the E-UTRAN such that a response message to the paging message must be transmitted, the UE under the RRC_IDLE state needs to connect the RRC connection.

A Non-Access Stratum (NAS) layer located above the RRC layer performs functions such as session management and mobility management.

In order to manage UE mobility, an EPS Mobility Management-REGISTERED (EMM-REGISTERED) state and an EMM-DEREGISTERED state are defined in the NAS layer. The EMM-REGISTERED state and the EMM-DEREGISTERED state are applied to a UE and a Mobility Management Entity (MME). The user equipment (UE) is initially in the EMM-DEREGISTERED state, and carries out an 'Initial Attach' procedure to access a network, thereby being registered in the corresponding network. If this 'Attach' procedure has been successfully carried out, the UE and the MME enter the EMM-REGISTERED state.

In order to manage a signaling connection between the UE and the EPC, an EPS Connection Management (ECM)-IDLE state and an ECM-CONNECTED state are defined. The above-mentioned states are applied to the UE and the MME. The UE in the ECM-IDLE state is in the ECM-CONNECTED state when establishing an RRC connection with an E-UTRAN. If the MME in the ECM-IDLE state makes an S1 connection with the E-UTRAN, it enters the ECM-CONNECTED state. If the UE is in the ECM-IDLE state, the E-UTRAN has no context information of the UE. Therefore, the UE in the ECM-IDLE state carries out a UE-based mobility procedure (e.g., cell selection or cell reselection) without receiving a command from the network. Otherwise, if the UE is in the ECM-CONNECTED state, UE mobility is managed by the network. If the UE is in the ECM-IDLE state and the UE's location recognized by the network changes to another UE location, the UE performs a Tracking Area Update procedure, such that it informs the network of the UE's location.

System information will hereinafter be described in detail. The system information includes requisite information that must be recognized by the UE that desires to access a base station (BS). Accordingly, the UE must receive all the system information before accessing the BS, and must always include the latest system information. In addition, the system information must be recognized by all UEs contained in one cell, such that the BS periodically transmits the system information.

The system information is classified into a master information block (MIB), a scheduling block (SB), a system information block (SIB), etc. The MIB includes physical configuration information (e.g., a bandwidth) of the corresponding cell. The SB includes transmission information such as a transmission period of each SIB. The SIB is an aggregate (or a set) of mutually-associated system information. For example, a certain SIB includes only information of a neighbor cell, and a certain SIB includes only information of an uplink radio channel used in the UE.

A base station (BS) transmits a paging message so as to inform the UE of the presence or absence of changed system information. In this case, the paging message includes a system information change indicator. The UE receives the paging message. If the received paging message includes a system information change indicator, the UE receives system information through a logical channel (e.g., a broadcast channel (BCCH)).

A relay will hereinafter be described in detail. The relay means a technology for mediating data between the UE and the BS. In more detail, if the UE is distant from the BS in the LTE system, since the UE has difficulty in easily communicating with the BS, the relay technology for solving this difficulty has been newly introduced to the LTE-A system. In order to perform such a relay function, a new network node called a relay node (RN) has been introduced between the UE and the BS, and the BS managing this relay node is referred to as a donor BS (also called a Donor eNodeB or DeNB). In addition, an interface between one RN that is newly generated by the RN and a donor BS is defined as a 'Un interface', such that this interface can be distinguished from a 'Uu interface' acting as an interface between a UE and a network node.

If the relay node (RB) provides a service to the UE through the Uu interface, the relay node (RN) can receive downlink (DL) data from the donor BS only through a Multimedia Broadcast Multicast Service Single Frequency Network (MBSFN) subframe so as to avoid interference. In this case, according to the conventional art, the donor BS can transmit system information of the donor BS to the relay node (RN) using the following two schemes. In accordance with a first one of the two schemes, the donor BS transmits system information for a relay node to one relay node (RN) through a dedicated RRC signaling. In accordance with a second scheme, the donor BS transmits system information for a relay node to the MBSFN subframe such that the system information can be utilized for a plurality of relay nodes (RNs). The first scheme has a disadvantage in that the donor BS has to transmit system information to each relay node (RN) when several relay nodes (RNs) are connected to the donor BS (donor eNB). The second scheme has a disadvantage in that the donor BS has to broadcast system information and system information for a relay node in different ways, such that duplicated system information is unavoidably broadcast.

DISCLOSURE OF INVENTION

Technical Problem

Accordingly, the present invention is directed to a method and apparatus for transmitting and receiving system information in a wireless system that substantially obviate one or more problems due to limitations and disadvantages of the related art.

As described above, the conventional art has a disadvantage in that the donor BS unavoidably repeatedly broadcasts system information.

An object of the present invention devised to solve the problem lies on a method for allowing a base station (BS) to effectively transmit system information in a wireless communication system including a relay node (RN).

It will be appreciated by persons skilled in the art that the objects that can be achieved with the present invention are not limited to what has been particularly described hereinabove and the above and other objects that the present invention can achieve will be more clearly understood from the following detailed description taken in conjunction with the accompanying drawings.

Solution to Problem

The object of the present invention can be achieved by providing a method for receiving system information of a wireless device wirelessly communicating with a base station (BS) and a terminal in a wireless communication system including receiving system information change information from the base station (BS) through a dedicated time unit used for communication between the base station (BS) and the wireless device; and receiving system information from the base station (BS) through a different time unit from the dedicated time unit.

The dedicated time unit may not be used for either communication between the base station (BS) and the terminal or communication between the wireless device and the terminal.

The wireless device may not transmit data to the terminal while receiving the system information.

The system information change information may be periodically received.

The system information change information may be used by one of System Information—Radio Network Temporary Identifier (SI-RNTI) or Paging Information—Radio Network Temporary Identifier (PI-RNTI) received via a Relay—Physical Downlink Control Channel (R-PDCCH).

The system information change information may be used by one of a paging message or a dedicated signaling received via the dedicated time unit.

The dedicated time unit may be a multimedia broadcast multicast service Single frequency network (MBSFN) subframe.

In another aspect of the present invention, provided herein is a method for transmitting system information by a base station (BS) in a wireless communication system including transmitting system information change information to a wireless device that wirelessly communicates with the base station (BS) and a terminal, through a dedicated time unit used for communication between the base station (BS) and the wireless device, and transmitting system information through a different time unit from the dedicated time unit.

Advantageous Effects of Invention

Exemplary embodiments of the present invention have the following effects. In accordance with the embodiments of the present invention, a base station (BS) transmits system information change information to the relay node (RN) through a dedicated time unit used for communication between the BS and a relay node (RN), and also transmits system information to the relay node (RN) and the UE through other time units other than the dedicated time unit, such that it can effectively transmit the system information.

It will be appreciated by persons skilled in the art that that the effects that can be achieved through the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a UMTS system serving as a mobile communication system, but the present invention is not limited thereto and the remaining parts of the present invention other than unique characteristics of the UMTS system are applicable to other mobile communication system.

In some cases, in order to prevent ambiguity of the concepts of the present invention, conventional devices or apparatuses well known to those skilled in the art will be omitted and be denoted in block diagram form on the basis of the important functions of the present invention. Wherever possible, the same reference numbers will be used throughout the drawings to refer to the same or like parts.

In the following description, a terminal may refer to a mobile or fixed user equipment (UE), for example, a user equipment (UE), a mobile station (MS) and the like. Also, the base station (BS) may refer to an arbitrary node of a network end which communicates with the above terminal, and may include a Node B (Node-B), an eNode B (eNode-B), and an access point (AP) and the like.

Figure 1:
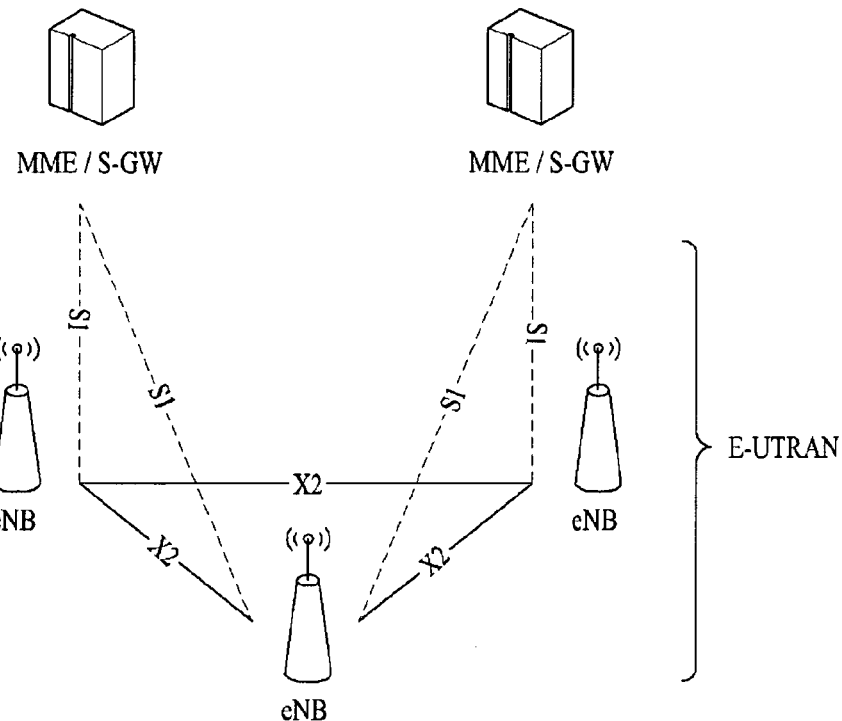
FIG. 1 is a conceptual diagram illustrating an Evolved Universal Terrestrial Radio Access Network (E-UTRAN) structure.
Figure 2:
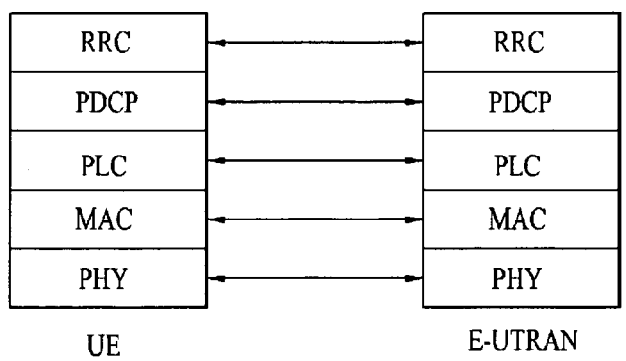
FIG. 2 illustrates a control plane of a radio interface protocol between a User Equipment (UE) and a UMTS Terrestrial Radio Access Network (UTRAN) according to the 3GPP wireless access network standard.
Figure 3:
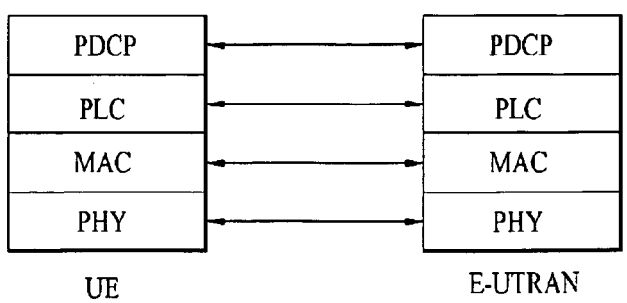
FIG. 3 illustrates a user plane (U-Plane) of a radio interface protocol between a User Equipment (UE) and an E-UTRAN according to the 3GPP wireless access network standard.
Figure 4:
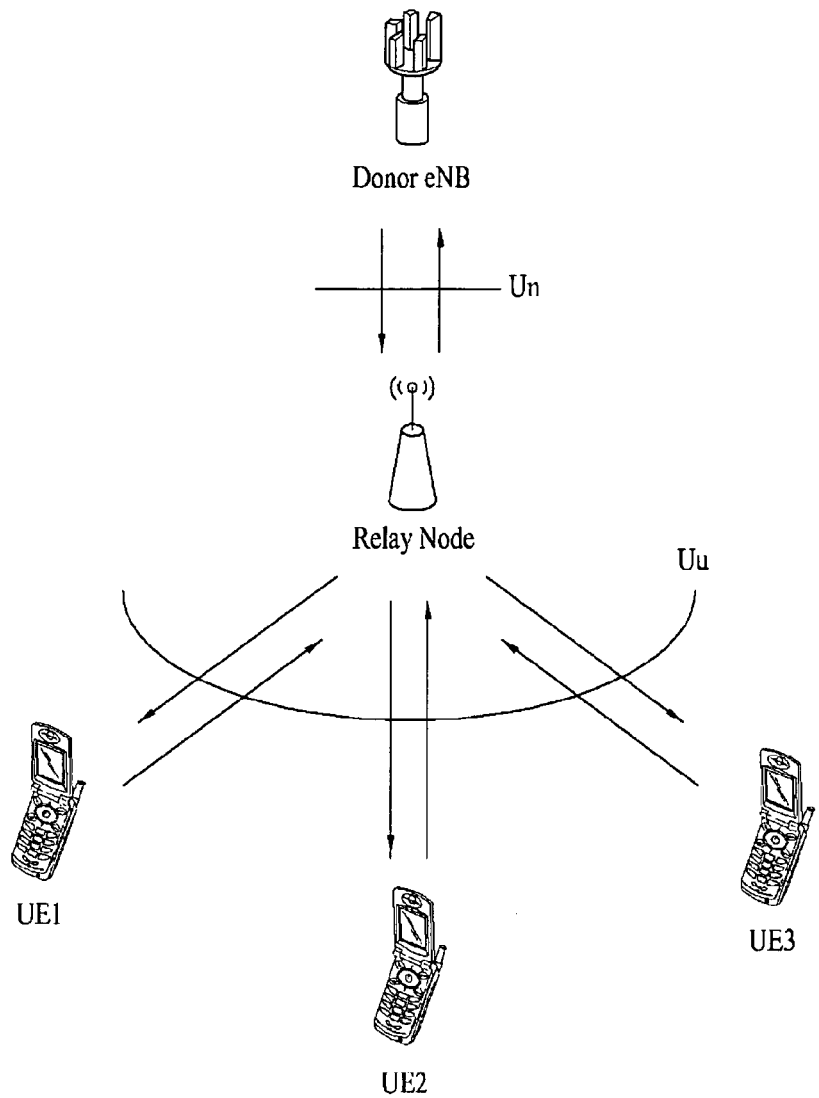
FIG. 4 is a conceptual diagram illustrating a relay node (RN).
Figure 5:
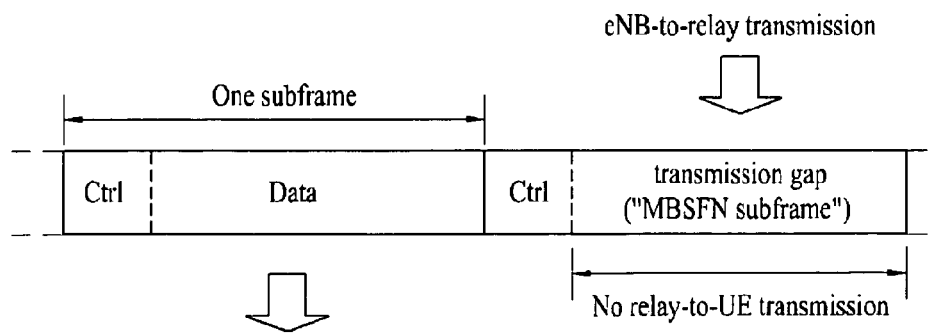
FIG. 5 is a conceptual diagram illustrating backhaul partitioning using an MBSFN subframe.

First, a relay will hereinafter be described with reference to FIGS. 4 and 5. FIG. 4 is a conceptual diagram illustrating a relay node (RN).

A relay will hereinafter be described in detail. The relay means a technology for mediating data between a user equipment (UE) and a base station (BS) (i.e., Evolved Node B or eNB). In more detail, if the UE is distant from the BS (i.e., eNB), since the UE has a difficulty in easily communicating with the BS, the relay technology for solving this difficulty has been newly proposed. The relay node (RN) is a network node that is located between the UE and the BS so as to perform a relay function. The relay node (RN) wirelessly communicates with each of the BS and the UE. The BS that manages this relay node is referred to as a donor BS (also called a donor eNodeB or DeNB). In addition, as shown in FIG. 4, an interface between one RN that is newly generated by the RN and a donor BS (donor eNB) is defined as a 'Un interface', and an interface between the UE and the network node is referred to as a 'Uu interface'.

The relay node manages the UE on behalf of the donor BS. In other words, from the viewpoint of the UE, the UE considers that the relay node (RN) operates as the BS. Accordingly, the Uu interface between the UE and the relay node uses the Uu interface protocol that has been used in the conventional LTE system without any change.

From the viewpoint of the donor BS (i.e., donor eNB), the relay node may operate as a UE or a BS according to individual conditions. That is, when the relay node initially gains access to the donor BS, since the donor BS does not know the presence of the relay node (RN), the relay node (RN) can access the donor BS through random access in the same manner as in the BS. After the relay node has accessed the donor BS, the relay node (RN) is operated in the same manner as in the BS that manages the UE connected to the RN itself. Therefore, the Un interface protocol is defined as the sum of the Uu interface protocol function and the network protocol function.

The Un interface may be classified into an Inband and an Outband. The Inband indicates an exemplary case in which the Un interface and the Uu interface share the same frequency band, and the Outband indicates an exemplary case in which the Un interface and the Uu interface use different frequency bands. In the case of the Inband, the Un interface and the Uu interface use the same frequency band, such that the Inband has a disadvantage in that interference unavoidably occurs between a transmitter and a receiver of the relay node (RN). In other words, in the case where the relay node transmits data to the donor BS and at the same time receives data from the UE during the same time unit, interference may unexpectedly occur in the relay node (RN).

In order to solve the above-mentioned interference problem, a multimedia broadcast multicast service single frequency network (MBSFN) subframe may be utilized for a backhaul link between the relay node and the donor BS. FIG. 5 is a conceptual diagram illustrating backhaul partitioning using an MBSFN subframe. In FIG. 5, the left subframe is used for downlink (DL) transmission in the direction from the relay node (RN) to the UE, and the right subframe is used for DL transmission in the direction from the donor BS to the relay node. A subframe used for DL transmission in the direction from the donor BS to the relay node may be an MBSFN subframe. Accordingly, the donor BS periodically allocates a plurality of MBSFN subframes so as to communicate with the relay node (RN), and informs the relay node (RN) of MBSFN subframe allocation information.

In order to transmit physical control information for a relay in the MBSFN subframe, a relay physical downlink control channel (R-PDCCH) is constructed. The relay node (RN) may receive either L1 control information for Un downlink data transmission through a downlink MBSFN subframe or allocation information for Un uplink data transmission from a donor BS over an R-PDCCH channel.

Figure 6:
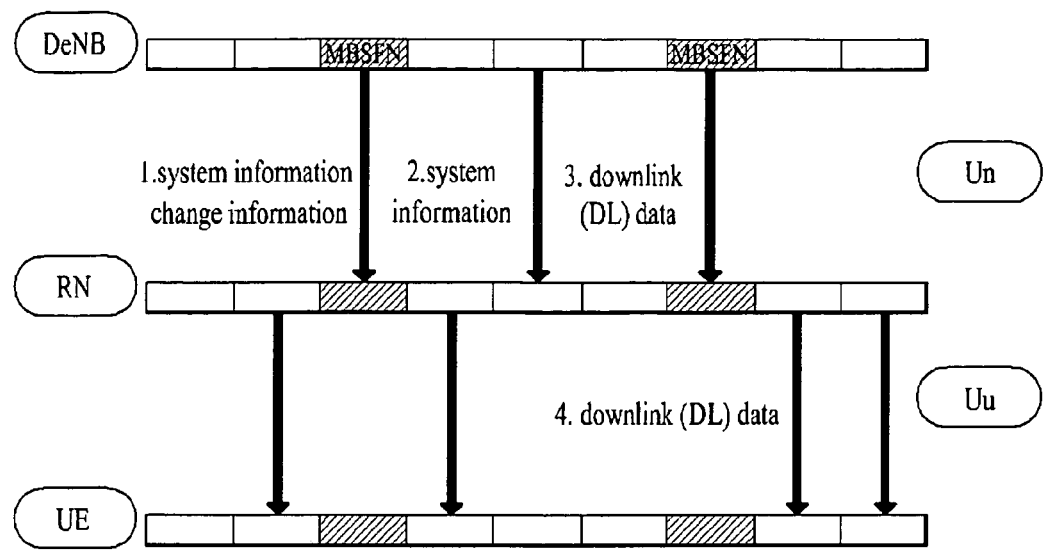
FIG. 6 is a conceptual diagram illustrating a method for transmitting and receiving system information according to embodiments of the present invention.

A method for transmitting and receiving system information according to one embodiment of the present invention will hereinafter be described with reference to FIG. 6. FIG. 6 is a conceptual diagram illustrating a method for transmitting and receiving system information according to embodiments of the present invention.

The BS allocates a dedicated time unit to be used for communication between the BS and at least one relay node (RN) connected to the BS, and transmits allocation information to relay nodes (RNs). In other words, if the BS communicates with each relay node (RN) through the MBSFN subframe, the BS allocates MBSFN subframes for at least one relay node (RN) connected to the BS. The MBSFN subframes for the relay node (RN) may be periodically allocated according to a predetermined pattern.

Each relay node (RN) establishes radio resource control (RRC) connection with the BS through the Un interface, and receives MBSFN subframe allocation information for the relay node from the BS. In addition, the relay node (RN) establishes the R-PDCCH upon receiving an indication message from the BS.

Thereafter, the relay node (RN) establishes RRC connection with at least one UE, and exchanges data with the at least one UE. The relay node (RN) may transmit data of UEs to the BS, or may transmit data received from the BS to the UE.

The relay node periodically obtains modification information of system information from the BS.

Referring to FIG. 6, the relay node (RN) receives system information change information through the allocated MBSFN subframe. In this case, in order to allow the relay node (RN) to periodically receive system information change information, the BS may inform the relay node (RN) of a time period during which system information change information is transmitted. In addition, the BS may broadcast system information change information to at least one relay node (RN) connected to the BS through the allocated MBSFN subframe.

The BS transmits a R-PDCCH indicating system information radio network temporary identifier (SI-RNTI) through the allocated MBSFN subframe, such that it can inform one or more relay nodes (RNs) of the changed system information. Otherwise, the BS transmits an R-PDCCH indicating a paging indicator—radio network temporary identifier (PI-RNTI) dedicated for a paging message through the allocated MBSFN subframe, such that it can inform one or more relay nodes (RNs) of the changed system information. In another example, the BS transmits a paging message indicating the change of system information through the allocated MBSFN subframe, such that it can inform each relay node of the changed system information. Otherwise, the BS transmits a dedicated message indicating the change of system information through the allocated MBSFN subframe, such that it can inform each relay node of the changed system information.

Therefore, if the R-PDCCH received through the MBSFN subframe indicates a system information—radio network temporary identifier (SI-RNTI), if the R-PDCCH received through the MBSFN subframe indicates a paging information—radio network temporary identifier (PI-RNTI) dedicated for the paging message received through the MBSFN subframe, if the paging message received through the MBSFN subframe indicates the change of system information, or if the dedicated message received through the MBSFN subframe indicates the change of system information, this means that system information of the BS has been changed.

The BS broadcasts system information to at least one UE and at least one relay node that are connected to the BS through the remaining subframes other than the allocated MBSFN subframe.

If a relay node (RN) receives system information change information through the allocated MBSFN subframe, the relay node (RN) receives system information of the BS through the remaining subframes other than the allocated MBSFN subframe. In this case, the relay node (RN) does not transmit data to each UE connected to the RN during a predetermined subframe during which the RN receives system information.

The relay node (RN) receives downlink data from the BS during the allocated MBSFN subframe, and does not transmit data to each UE connected to the RN during the allocated MBSFN subframe.

The relay node (RN) can transmit data to each UE connected to RN through the remaining subframes other than the allocated MBSFN subframe.

Figure 7:
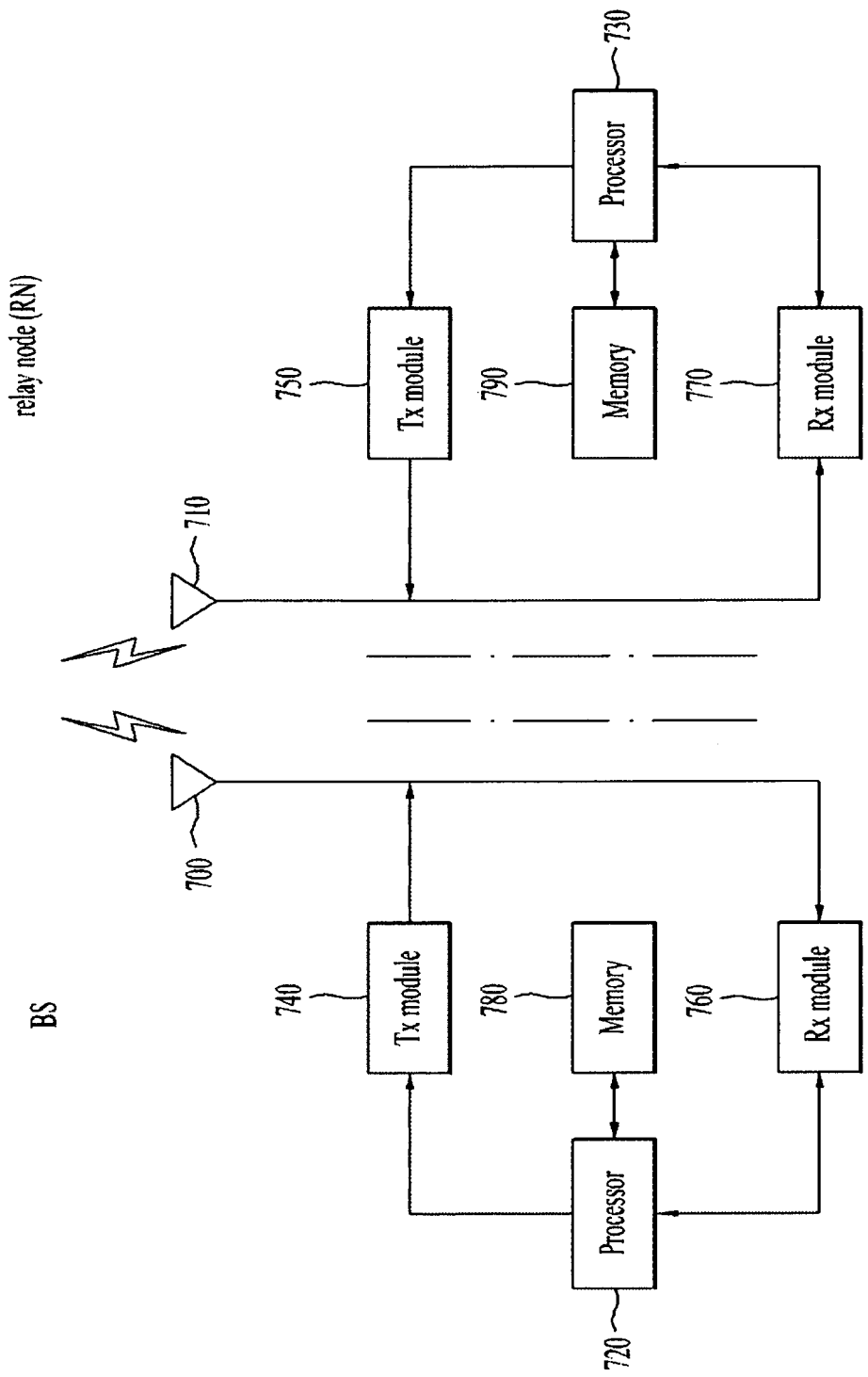
FIG. 7 is a block diagram illustrating a base station (BS) and a relay node (RN) for use in embodiments of the present invention.

FIG. 7 is a block diagram illustrating a base station (BS) and a relay node (RN) for use in embodiments of the present invention.

Referring to FIG. 7, each of the relay node (RN) and the base station (BS) may include an antenna 700 or 710 for transmitting and receiving information, data, signals and/or messages, a Transmission (Tx) module 740 or 750 for transmitting messages by controlling the antenna 700 or 710, a Reception (Rx) module 760 or 770 for receiving messages by controlling the antenna 700 or 710, a memory 780 or 790 for storing information related to BS communication, and a processor 720 or 730 for controlling the memory 780 or 790.

The antennas 700 and 710 include Tx antennas for transmitting signals generated from Tx modules 740 and 750 and Rx antennas for receiving radio frequency (RF) signals and providing the received RF signals to the Rx modules 760 and 770. If a Multiple Input Multiple Output (MIMO) function is supported, two or more antennas may be provided.

The processors 720 and 730 generally provide overall control to the RN and the BS, respectively. Especially, the processors 720 and 730 may perform a control function for implementing the above-described exemplary embodiments of the present invention, a variable MAC frame control function based on service characteristics and a propagation environment, a handover function, an authentication and encryption function, etc. In addition, each of the processors 720 and 730 may include an encryption module for controlling encryption of various messages and a timer module for controlling transmission and reception of various messages.

The transmission (Tx) modules 740 and 750 may encode and modulate transmission data scheduled by the processors 720 and 730 according to a predetermined coding and modulation scheme and provide the modulated data to the antennas 700 and 710.

The transmission (Tx) module 740 transmits dedicated time unit—based allocation information used for communication between the BS and the RN to the RN. In addition, the Tx module 740 broadcasts system information through a time unit other than the dedicated time unit.

The reception (Rx) modules 760 and 770 may recover original data by demodulating and decoding data received through the antennas 700 and 710 and provide the recovered data to the processors 720 and 730.

The reception (Rx) module 770 of the RN receives dedicated time unit—based allocation information used for communication between the BS and the RN from the BS, receives system information change information through the dedicated time unit, and receives system information from the BS through the remaining time units other than the dedicated time unit.

The memories 780 and 790 may store programs for processing and control of the processors 720 and 730 and temporarily store input/output data (on the side of the mobile station (MS), an uplink grant received from the BS, system information, a station identifier (STID), a flow identifier (FID), an action time, and the like).

Each of the memories 780 and 790 may include at least one type of storage media such as a flash memory, a hard disk, a multimedia card micro, a card-type memory (e.g. a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory, a magnetic memory, a magnetic disc, an optical disc, etc.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other.

Accordingly, the invention should not be limited to the specific embodiments described herein, but should be accorded the broadest scope consistent with the principles and novel features disclosed herein.

MODE FOR THE INVENTION

Various embodiments have been described in the best mode for carrying out the invention.

INDUSTRIAL APPLICABILITY

The exemplary embodiments of the present invention are applicable to various wireless access systems.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided based upon a rational analysis of the claims, and all modifications within the equivalent range of the present invention are within the scope of the present invention.

The invention claimed is:

1. A method for receiving system information by a wireless relay node (RN) wirelessly communicating with a base station (BS) and a terminal in a wireless communication system, the method comprising: receiving change information from the base station (BS) through a Multimedia Broadcast multicast service Single Frequency Network (MBSFN) subframe used for communication between the base station (BS) and the relay node (RN); and receiving changed system information from the base station (BS) through a non-MBSFN subframe, wherein the relay node (RN) does not transmit data to the terminal while receiving the changed system information through the non-MBSFN subframe; wherein the MBSFN subframe is not used for either communication between the base station (BS) and the terminal or communication between the relay node (RN) and the terminal.

2. The method according to claim 1, wherein the change information is periodically received.

3. The method according to claim 1, wherein the change information is received by using one of System Information—Radio Network Temporary Identifier (SI-RNTI) or Paging Information—Radio Network Temporary Identifier (PI-RNTI) received via a Relay—Physical Downlink Control Channel (R-PDCCH).

4. The method according to claim 1, wherein the change information is received by using one of a paging message or a dedicated signaling received via the MBSFN subframe.

5. A method for transmitting system information by a base station (BS) in a wireless communication system, the method comprising:
    transmitting change information to a relay node (RN) that wirelessly communicates with the base station (BS) and a terminal, through a Multimedia Broadcast multicast service Single Frequency Network (MBSFN) subframe used for communication between the base station (BS) and the relay node (RN);
    and transmitting changed system information to the relay node (RN) through a unit non-MBSFN subframe, wherein the relay node (RN) does not transmit data to the terminal while receiving the changed system information through the non-MBSFN subframe; wherein the MBSFN subframe is not used for either communication between the base station (BS) and the terminal or communication between the relay node (RN) and the terminal.

6. The method according to claim 5, wherein the change information is periodically transmitted.

7. The method according to claim 5, wherein the change information is transmitted by using one of System Information—Radio Network Temporary Identifier (SI-RNTI) or Paging Information—Radio Network Temporary Identifier (PI-RNTI) via a Relay—Physical Downlink Control Channel (R-PDCCH).

8. The method according to claim 5, wherein the change information is transmitted by using one of a paging message or a dedicated signaling via the MBSFN subframe.

* * * * *